United States Patent Office 3,520,954
Patented July 21, 1970

3,520,954
PRODUCTION OF VULCANIZABLE RUBBER-CONTAINING MIXTURES
Harald Blumel and Wilhelm Schanzer, Marl, Germany, assignors to Chemische Werke Huls A.G., Marl, Germany
No Drawing. Continuation of application Ser. No. 457,815, May 21, 1965. This application Jan. 29, 1968, Ser. No. 701,469
Claims priority, application Germany, May 22, 1964, 1,261,311
Int. Cl. C08d 9/04, 13/02, 1/09
U.S. Cl. 260—894                    7 Claims

ABSTRACT OF THE DISCLOSURE

Vulcanized products of cold rubber and polybutadiene, such products having improved resistance to crack growth by virtue of the cold rubber and polybutadiene being blended as latices before being compounded and vulcanized.

---

This application is a continuation of application, Ser. No. 457,815, filed May 21, 1965, now abandoned.

The present invention relates to rubber compositions based on polybutadiene and cold rubber.

It has been known to utilize for the production of rubber articles, particularly those which are subjected to variable and repeated dynamic stresses, blends or mixtures of different rubber types.

Thus, polybutadiene rubber produced according to the "Ziegler Process" has already been blended with natural rubber or cold rubber; in this process, it is possible to partially combine the advantageous abrasion properties of the polybutadiene rubber with the excellent processing properties of natural rubber or cold rubber. Also, when using vulcanizable blends of solid polybutadiene rubber manufactured according to an emulsion polymerization process, and solid cold rubber as conventionally produced, the advantages of an increased wear resistance in comparison with pure cold rubber mixtures (particularly important for the tire treads), are combined with the advantage of practically the same ease of processing of straight cold rubber. These previously known blends were produced in all cases during the production of the vulcanizable rubber recipes in conventional blending devices, for example rubber mills or internal mixers. In such devices the dry rubbers are mixed together, inasmuch as it is then possible in what amounts to one mixing step, to add simultaneously or immediately afterward further conventional ingredients of the rubber mixture, for example fillers, metallic oxides, softeners, agents which impart resistance to aging, vulcanizing agents, etc. The vulcanized products produced by this method exhibit good properties, by and large, but their resistance to the growth of cracks upon repeated flex is relatively low.

An object of this invention is to provide an improvement in the production of such rubber blends whereby the final vulcanized products exhibit much better resistance to the growth of cracks upon being subjected to repeated flexes.

Another object is to provide vulcanized products as produced by the process of this invention.

Still another object is to provide combined latexes, as produced according to this invention.

Upon further study of the specification and claims, other objects and advantages of the present invention will become apparent.

To attain the objects of this invention, there is provided a process based on the discovery that it is possible to produce vulcanizable rubber-containing mixtures leading to vulcanized products with improved resistance to the growth of cracks, if as the rubber component of this mixture rubber blends are used which are obtained by combining the aqueous latices of polybutadiene rubber produced according to an emulsion polymerization process, on the one hand, and of cold rubber on the other hand, and by conventionally working up these latices.

Polybutadiene rubbers which are produced according to an emulsion polymerization process are to be understood to mean those polybutadiene rubbers which are produced at low temperatures with hydroperoxide-catalysts, i.e. at temperatures below 20° C., preferably at 5° C. For more specific information regarding the production of such emulsions, attention is invited to the pertinent patents and chemical literature, e.g. the Deutsche Auslegeschrift 1,024,242 (U.S. Rubber Company, N.Y.), Example 9.

Cold rubbers which are suitable are, for example, emulsion copolymers of butadiene and styrene, or butadiene and acrylonitrile, which are produced at temperatures below 20° C., preferably at 5° C. For more specific information regarding the production of these cold rubbers, attention is invited to the pertinent patents and chemical literature, e.g. the Deutsche Auslegeschrift 1,024,242 (U.S. Rubber Company, N.Y.), Examples 1 to 8.

In general, the weight ratio of the components of the blend can be varied in all proportions, preferably from 95:5 to 10:90, more preferably in the range of 75:25 to 25:75. The weight ratios refer to solid matter.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A polybutadiene rubber latex produced by emulsion polymerization at 5° C. is mixed, under stirring, with a cold rubber latex (rubber Type 1500) in accordance with the data contained in Table 1 infra.

TABLE 1

| Polybutadiene rubber latex produced by an emulsion polymerization process, percentage: 25% [1] (parts by weight) | Cold rubber latex, percentage: 22% [2] (parts by weight) | Rubber proportion (parts by weight of solid matter) | Rubber blend for mixture |
|---|---|---|---|
| 30.0 | 11.4 | 75:25 | II |
| 20.0 | 22.8 | 50:50 | III |
| 10.0 | 34.2 | 25:75 | IV |

[1] Of rubbery solid matter, produced according to Example 9 of Deutsche Auslegeschrift 1,024,242 (U.S. Rubber Company).
[2] Of rubbery solid matter, rubber Type 1500 refer to Description of Types of Styrene Butadiene Rubber (SBR) and Butadiene Rubber (BR) Dry Polymers and Latices, International Institute of Synthetic Rubber Producers, Inc., August 1963 Edition, Table II, Cold Non-Pigmented Polymers, line 1.

The latex mixtures are mixed with 1.25 percent by weight, based on rubber, of phenyl-$\beta$-naphthylamine as a stabilizer and coagulated, in a conventional manner, with aqueous NaCl solution and sulfuric acid. The rubber blends precipitate in the form of coarse granules which are washed, ground, and dried in the usual way.

With the thus-produced rubber blends, the corresponding finished mixtures are produced, according to the recipe set forth in Table 2. This is done in a "Werner und Pfleiderer" masticator of the GK 2 Type, at 40 r.p.m. for the front rotor, at a jacket temperature of 50° C., and at a total mixing time of 12 minutes. The basic mixtures free of vulcanizing agents are obtained thereby, and after a storage time of 12 hours, the corresponding finished mixtures are produced on the roll mill by admixture of sulfur and accelerator. The values for the vulcanized product obtained by a vulcanization at 150° C. are shown in Table 3. The mixtures are designated with II, III, and IV, depending upon the specific rubber blend set forth in Table 1. For purposes of comparison, in addition to these mixtures, there are also described those mixtures which are obtained with the rubber components on which the rubber blends are based (mixtures I and V, respectively).

TABLE 2.—MIXTURE COMPOSITION (IN PARTS BY WEIGHT)

|  | I | II | III | IV | V |
|---|---|---|---|---|---|
| Polybutadiene rubber (produced according to an emulsion-polymerization process) [a] | 100.00 | 75.00 | 50.00 | 25.00 |  |
| Cold rubber, Type 1500 [b] |  | 25.00 | 50.00 | 75.00 | 100.00 |
| Zinc oxide | 5.00 | 5.00 | 5.00 | 5.00 | 5.00 |
| "HAF" Carbon black | 47.50 | 47.50 | 47.50 | 47.50 | 47.50 |
| Aromatic plasticizer [c] | 8.00 | 8.00 | 8.00 | 8.00 | 8.00 |
| Phenyl-β-naphthylamine | 1.00 | 1.00 | 1.00 | 1.00 | 1.00 |
| N-phenyl-N-isopropyl-phenylene diamine | 1.00 | 1.00 | 1.00 | 1.00 | 1.00 |
| Protective wax for sunlight resistance [d] | 1.00 | 1.00 | 1.00 | 1.00 | 1.00 |
| Sulfur | 1.50 | 1.50 | 1.50 | 1.50 | 1.50 |
| N-cyclohexyl-2-benzothiazyl sulfene amide | 0.75 | 0.75 | 0.75 | 0.75 | 0.75 |

[a] Refer to Table 1.
[b] Refer to Table 1.
[c] Naphtolen MV having following analytic dates: Aromatic bound C-atoms, 44%; naphtenic bound, C-atoms, 37%; Paraffinic bound, C-atoms, 19%.
[d] Ocokerite.

In parallel with the above, mixtures are produced containing blends of polybutadiene rubber, produced according to an emulsion polymerization process, and cold rubber in the same blend proportions as mixtures II, III, and IV; however, there is the difference that the rubber blend components used for this purpose are blended and mixed in a conventional manner in the form of dry rubbers. These mixtures are designated, corresponding to their blend proportions, as IIa, IIIa, and IVa.

From Tables 3 and 4, it can be seen that the blends produced in accordance with the invention lead to markedly improved values for resistance to the growth of cracks of the vulcanized products produced therefrom, in comparison with the blends produced according to the state of the art.

EXAMPLE 2

A polybutadiene rubber latex produced by emulsion polymerization at 5° C. is mixed, under stirring, with an oil-containing cold rubber latex (rubber Type 1709) in correspondence with the data contained in the following Table 5.

TABLE 3

| Type of Mixture (See Table 1) | Defo plastic-ity [3] | Mooney viscosity of mixture ML-4 | Vulcan-izing time (150° C.) | Tensile strength (kg./cm.[2]) | Elonga-tion (per-cent) | Modulus 300% (kg./cm.[2]) | Perma-nent elonga-tion (per-cent) | Tear resistance (kg. abso-lute to Pohle | Hard-ness (degrees Shore) | Elasticity 22° C. per-cent | Elasticity 75° C. per-cent | DVM,[1] abra-sion (mm.[3]) | Resistance[2] to crack growth upon flex-ing in a De-Mattia machine |
|---|---|---|---|---|---|---|---|---|---|---|---|---|---|
| I | 1950/35 | 70 | 15' | 122 | 475 | 64 | 11 | 11 | 58 | 45 | 44 | 51 |  |
|  |  |  | 30' | 171 | 415 | 105 | Broken | 13 | 61 | 46 | 52 | 53 | 9,500. |
|  |  |  | 60' | 172 | 385 | 119 | Broken | 11 | 61 | 50 | 53 |  | 12,200. |
|  |  |  | 120' | 165 | 380 | 121 | Broken | 12 | 61 | 48 | 51 |  |  |
| II | 1650/30 | 59 | 15' | 31 | 575 | 16 | 35 | 4 | 48 | 40 | 34 | 48 |  |
|  |  |  | 30' | 173 | 535 | 73 | 20 | 15 | 58 | 45 | 49 | 45 | 31,200. |
|  |  |  | 60' | 181 | 450 | 100 | 8 | 14 | 60 | 48 | 52 |  | 22,700. |
|  |  |  | 120' | 180 | 445 | 100 | 7 | 14 | 60 | 48 | 52 |  |  |
| III | 1375/27 | 54 | 15' | 26 | 715 | 10 | 62 | 4 | 45 | 40 | 34 | 54 |  |
|  |  |  | 30' | 178 | 470 | 65 | 12 | 17 | 57 | 45 | 49 | 54 | 51,700. |
|  |  |  | 60' | 192 | 485 | 91 | 9 | 14 | 60 | 46 | 53 |  | 35,000. |
|  |  |  | 120' | 196 | 480 | 95 | 8 | 13 | 60 | 46 | 52 |  |  |
| IV | 1275/23 | 53 | 15' | 49 | 900 | 12 | 71 | 7 | 47 | 40 | 36 | 67 |  |
|  |  |  | 30' | 195 | 645 | 60 | 15 | 20 | 55 | 43 | 48 | 65 | 95,000. |
|  |  |  | 60' | 218 | 545 | 86 | 10 | 17 | 60 | 45 | 52 |  | 85,000. |
|  |  |  | 120' | 218 | 535 | 92 | 10 | 16 | 60 | 45 | 51 |  |  |
| V | 1025/20 | 53 | 15' | 45 | 850 | 12 | 88 | 5 | 46 | 41 | 36 | 70 | {18.3 mm. at |
|  |  |  | 30' | 227 | 630 | 74 | 11 | 18 | 56 | 43 | 53 | 60 | {115,000.[5] |
|  |  |  | 60' | 236 | 550 | 95 | 10 | 15 | 60 | 43 | 55 |  | 90,000. |
|  |  |  | 120' | 231 | 530 | 95 | 10 | 15 | 60 | 43 | 53 |  |  |

[1] As per DIN 53–516 (German Industry Norm 53–516), abrasion resistance.
[2] Number of strokes to widen a 2 mm. crack to 20 mm.
[3] As per DIN 53–514.
[4] As per DIN 53–522.
[5] In this case a crack width of only 18.3 mm. is reached at a stroke number of 115,000 in all other cases the crack width being 20 mm. for the given stroke numbers.

TABLE 4

| Type of Mixture (See Table 1) | Defo plastic-ity [3] | Mooney viscosity of mixture ML-4 | Vulcan-izing time (150° C.) | Tensile strength (kg./cm.[2]) | Elonga-tion (per-cent) | Modulus 300% (kg./cm.[2]) | Perma-nent elonga-tion (per-cent) | Tear resistance (kg. abso-lute to Pohle | Hard-ness (degrees Shore) | Elasticity 22° C. per-cent | Elasticity 75° C. per-cent | DVM,[1] abra-sion (mm.[3]) | Resistance[2] to crack growth upon flex-ing in a De-Mattia machine |
|---|---|---|---|---|---|---|---|---|---|---|---|---|---|
| IIa | 1550/34 | 62 | 15' | 116 | 600 | 43 | 20 | 10 | 54 | 42 | 43 | 49 | 18,300 |
|  |  |  | 30' | 175 | 445 | 97 | 7 | 14 | 60 | 46 | 53 | 50 |  |
|  |  |  | 60' | 180 | 415 | 110 | Broken | 12 | 61 | 48 | 53 |  | 15,500 |
|  |  |  | 120' | 188 | 435 | 100 | 7 | 12 | 61 | 48 | 51 |  |  |
| IIIa | 1350/29 | 56 | 15' | 162 | 715 | 41 | 21 | 15 | 53 | 43 | 43 | 50 |  |
|  |  |  | 30' | 216 | 520 | 90 | 10 | 15 | 60 | 45 | 53 | 55 | 31,200 |
|  |  |  | 60' | 187 | 440 | 103 | Broken | 13 | 60 | 47 | 54 |  | 30,000 |
|  |  |  | 120' | 221 | 495 | 103 | 9 | 14 | 60 | 47 | 53 |  |  |
| IVa | 1200/24 | 54 | 15' | 99 | 745 | 23 | 38 | 10 | 50 | 42 | 40 | 56 |  |
|  |  |  | 30' | 212 | 545 | 81 | 10 | 18 | 59 | 44 | 52 | 64 | 83,300 |
|  |  |  | 60' | 189 | 440 | 101 | Broken | 15 | 60 | 45 | 54 |  | 73,300 |
|  |  |  | 120' | 240 | 535 | 98 | 10 | 14 | 60 | 45 | 51 |  |  |

[1] As per DIN 53–516 (German Industry Norm 53–516), abrasion resistance.
[2] Number of strokes to widen a 2 mm. crack to 20 mm.
[3] As per DIN 53–514.
[4] As per DIN 53–522.

TABLE 5

| Polybutadiene rubber latex, produced in accordance with an emulsion polymerization process, percentage: 25% [1] (parts by weight) | Oil containing cold rubber latex, percentage: 30.2% [3] parts by weight) | Rubber proportion (parts by weight of solid matter) | Rubber blend for mixture |
|---|---|---|---|
| 30.0 | 8.3 | 75:25 | VI |
| 20.0 | 16.6 | 50:50 | VII |
| 10.0 | 24.9 | 25:75 | VIII |

[1] Of rubbery solid matter, produced according to Examples 1 to 8 of Deutsche Auslegeschrift 1,024,242 (U.S. Rubber Company).
[2] Of rubbery solid matter, rubber Type 1709, refer to Description of Types of Styrene Butadiene Rubber (SBR) and Butadiene Rubber (BR) Dry Polymers and Latices, International Institute of Synthetic Rubber Producers, Inc., August 1963 Edition, Table II, Cold Oil Masterbatch, line 11.

The latex mixtures are mixed with 1.25 percent by weight, based on rubber, of phenyl-$\beta$-naphthylamine as a stabilizer, and coagulated in a conventional manner with aqueous NaCl solution and sulfuric acid. The rubber blends precipitate in the form of large granules which are washed, ground, and dried in a known manner. Here, too, there are produced, in accordance with the recipe set forth in Table 6 and analogous to Example 1, vulcanizable rubber mixtures which are designated as VI, VII, and VIII, according to the rubber blend proportion of Table 6. For reasons of comparison, there are described, in addition to these mixtures, those which were produced with the rubber components on which the rubber blends are based (mixtures I and IX, respectively).

In parallel with the above, mixtures are produced which contain blends of polybutadiene rubber, produced by an emulsion polymerization process, and cold rubber extended with oil, in the same blend proportions as mixtures VI, VIII, and VII; there is, however, the difference that the rubber blend components used therefor are blended and mixed with one another in the form of dry rubbers during the production of the mixture, in accordance with the state of the art. These mixtures are designated as VIa, VIIa, and VIIIa, corresponding to the blend proportions.

In the same manner as in Example 1, there can be seen from Tables 7 and 8 that the blends produced in accordance with the present invention exhibit markedly improved values for the resistance to the growth of cracks upon repeated flex of the vulcanized products manufactured therefrom, in comparison to the blends obtained according to the prior art.

TABLE 6.—MIXTURE COMPOSITION (IN PARTS BY WEIGHT)

| | I | VI | VII | VIII | IX |
|---|---|---|---|---|---|
| Polybutadiene rubber (produced according to an emulsion-polymerization process) [a] | 100.00 | 75.00 | 50.00 | 25.00 | |
| Cold rubber, Type 1709 [b] | | 25.00 | 50.00 | 75.00 | 100.00 |
| Zinc oxide | 5.00 | 5.00 | 5.00 | 5.00 | 5.00 |
| "HAF" Carbon black | 47.50 | 47.50 | 47.50 | 47.50 | 47.50 |
| Aromatic plasticizer [c] | 8.00 | 8.00 | 8.00 | 8.00 | 8.00 |
| Phenyl-$\beta$-naphthylamine | 1.00 | 1.00 | 1.00 | 1.00 | 1.00 |
| N-phenyl-N-isopropyl-phenylene diamine | 1.00 | 1.00 | 1.00 | 1.00 | 1.00 |
| Protective wax for sunlight resistance [d] | 1.00 | 1.00 | 1.00 | 1.00 | 1.00 |
| Sulfur | 1.75 | 1.75 | 1.75 | 1.75 | 1.75 |
| N-cyclohexyl-2-benzothiazyl sulfene amide | 0.90 | 0.90 | 0.90 | 0.90 | 0.90 |

[a] Refer to Table 5.
[b] Refer to Table 5.
[c] Naphtolen MV having following analytic dates: Aromatic bound, C-atoms, 44%; Naphthtenic bound, C-atoms, 37%; Paraffinic bound, C-atoms, 19%.
[d] Ocokerite.

TABLE 7

| Type of Mixture (See Table 1) | Defo plasticity [3] | Mooney viscosity of mixture ML-4 | Vulcanizing time (150° C.) | Tensile strength (kg./cm.[2]) | Elongation (percent) | Modulus 300% (kg./cm.[2]) | Permanent elongation (percent) | Tear resistance (kg. absolute to Pohle) | Hardness (degrees Shore) | Elasticity 22° C. percent | Elasticity 75° C. percent | DVM,[1] abrasion (mm.[3]) | Resistance [2] to crack growth upon flexing in a De Mattia machine [4] |
|---|---|---|---|---|---|---|---|---|---|---|---|---|---|
| I | 2000/43 | 70 | 15' | 192 | 465 | 58 | 10 | 14 | 62 | 47 | 53 | | |
| | | | 30' | 184 | 355 | 146 | 7 | 10 | 65 | 50 | 57 | 56 | 5,500 |
| | | | 60' | 200 | 360 | 158 | 7 | 9 | 65 | 50 | 58 | | 4,800 |
| | | | 120' | 187 | 345 | 155 | 6 | 9 | 65 | 50 | 57 | 60 | |
| VI | 1400/34 | 53 | 15' | 116 | 650 | 38 | 19 | 11 | 52 | 41 | 44 | | |
| | | | 30' | 192 | 475 | 100 | 9 | 12 | 60 | 47 | 56 | | 12,300 |
| | | | 60' | 181 | 400 | 119 | 7 | 10 | 61 | 48 | 59 | | 9,300 |
| | | | 120' | 175 | 395 | 116 | 7 | 10 | 61 | 48 | 58 | 71 | |
| VII | 1200/32 | 47 | 15' | 85 | 785 | 20 | 33 | 9 | 46 | 38 | 40 | | |
| | | | 30' | 188 | 495 | 88 | 11 | 12 | 59 | 45 | 55 | 82 | 20,000 |
| | | | 60' | 179 | 420 | 107 | 8 | 10 | 60 | 54 | 57 | | 14,700 |
| | | | 120' | 186 | 435 | 105 | 8 | 8 | 60 | 44 | 57 | 79 | |
| VIII | 1000/30 | 40 | 15' | 138 | 880 | 23 | 31 | 12 | 46 | 36 | 44 | | |
| | | | 30' | 202 | 565 | 77 | 17 | 12 | 55 | 40 | 57 | | 36,700 |
| | | | 60' | 194 | 500 | 91 | 12 | 11 | 56 | 40 | 57 | | 30,900 |
| | | | 120' | 206 | 515 | 94 | 12 | 11 | 56 | 40 | 57 | 107 | |
| IX | 825/25 | 38 | 15' | 19 | 1035 | 3 | >100 | 2 | 35 | 33 | 33 | | |
| | | | 30' | 191 | 605 | 68 | 19 | 13 | 51 | 35 | 52 | 143 | 44,000 |
| | | | 60' | 190 | 515 | 86 | 14 | 10 | 55 | 35 | 57 | | 38,800 |
| | | | 120' | 196 | 530 | 86 | 12 | 11 | 55 | 35 | 60 | 137 | |

[1] As per DIN 53-516 (German Industry Norm 53-516), abrasion resistance.
[2] Number of strokes to widen a 2 mm. crack to 20 mm.
[3] As per DIN 53-514.
[4] As per DIN 53-522.

TABLE 8

| Type of Mixture (See Table 1) | Defo plasticity [3] | Mooney viscosity of mixture ML-4 | Vulcanizing time (150° C.) | Tensile strength (kg./cm.[2]) | Elongation (percent) | Modulus 300% (kg./cm.[2]) | Permanent elongation (percent) | Tear resistance (kg. absolute to Pohle) | Hardness (degrees Shore) | Elasticity 22° C. percent | Elasticity 75° C. percent | DVM,[1] abrasion (mm.[3]) | Resistance [2] to crack growth upon flexing in a De-Mattia machine [4] |
|---|---|---|---|---|---|---|---|---|---|---|---|---|---|
| VIa | 1400/36 | 55 | 15' | 188 | 555 | 73 | 11 | 14 | 59 | 45 | 59 | | |
| | | | 30' | 172 | 390 | 115 | 7 | 11 | 61 | 48 | 59 | 64 | 7,200 |
| | | | 60' | 180 | 380 | 124 | 6 | 9 | 62 | 48 | 58 | | 10,000 |
| | | | 120' | 184 | 395 | 122 | 7 | 9 | 61 | 48 | 57 | 67 | |
| VIIa | 1250/33 | 49 | 15' | 137 | 745 | 33 | 22 | 12 | 50 | 39 | 45 | | |
| | | | 30' | 191 | 470 | 96 | 10 | 12 | 60 | 45 | 58 | 73 | 14,300 |
| | | | 60' | 181 | 410 | 112 | 8 | 10 | 60 | 45 | 58 | | 15,000 |
| | | | 120' | 190 | 435 | 109 | 7 | 10 | 60 | 45 | 57 | 74 | |
| VIIIa | 1050/30 | 43 | 15' | 77 | 855 | 15 | 38 | 8 | 45 | 37 | 40 | | |
| | | | 30' | 188 | 520 | 79 | 12 | 13 | 55 | 42 | 57 | 108 | 25,000 |
| | | | 60' | 183 | 460 | 96 | 10 | 10 | 58 | 41 | 58 | | 22,300 |
| | | | 120' | 187 | 465 | 99 | 9 | 10 | 57 | 41 | 56 | 104 | |

[1] As per DIN 53-516 (German Industry Norm 53-516), abrasion resistance.
[2] Number of strokes to widen a 2 mm. crack to 20 mm.
[3] As per DIN 53-514.
[4] As per DIN 53-522.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vulcanized rubbery product of polybutadiene and butadiene-styrene cold rubber, said product having substantially improved resistance to the growth of cracks upon being subjected to repeated flexing, and being produced by the process comprising the steps of:
   (a) blending an emulsion-polybutadiene and a cold rubber consisting essentially of a butadiene-styrene copolymer, said blending step comprising producing said cold rubber in the form of an aqueous latex thereof; producing said emulsion-polybutadiene in the form of an aqueous latex thereof; combining the two latices to obtain a substantially homogeneous latex of the two rubbery polymers, and separating the solids of the combined latices;
   (b) masticating and compounding the resultant solids into a mixture suitable for vulcanization; and
   (c) vulcanizing the resultant mixture; said rubbery product having an improved resistance to the growth of cracks as compared to the products of the same composition wherein step (a) is a mechanical blending step.

2. The product of claim 1 wherein the polybutadiene is polymerized at a temperature of about 5° C.

3. The product of claim 1 wherein the cold rubber is polymerized at a temperature of about 5° C.

4. The product of claim 1 wherein the weight ratio of cold rubber to polybutadiene is 90:10 to 10:90.

5. The product of claim 1 wherein the weight ratio of cold rubber to polybutadiene is 75:25 to 25:75.

6. A vulcanized product as defined by claim 1 wherein said product is a tire tread.

7. A vulcanized product as defined by claim 3 wherein said product is a tire tread.

References Cited

UNITED STATES PATENTS 2,657,190  10/1953  Banes et al. _____ 260—894

FOREIGN PATENTS 666,753  7/1963  Canada.

SAMUEL H. MLECH, Primary Examiner

W. J. BRIGGS, Jr., Assistant Examiner

U.S. Cl. X.R.

152—330; 260—29.7

UNITED STATES PATENT OFFICE
CERTIFICATE OF CORRECTION

Patent No. 3,520,954     Dated July 21, 1970

Inventor(s) HARALD BLUMEL et al

It is certified that error appears in the above-identified patent and that said Letters Patent are hereby corrected as shown below:

Column 3, Table 3, III, under Column "Elongation (percent)" 10th number down, change "470" to ---570---

Column 3, Table 3, I, under Column "Modulus 300%," 4th number down, change "121" to ---112---

Column 6, Table 7, VII, under Column "Elasticity, 22° C. percent" 11th number down, change "54" to ---45---

SIGNED AND
SEALED
OCT 13 1970

(SEAL)
Attest:

Edward M. Fletcher, Jr.
Attesting Officer

WILLIAM E. SCHUYLER, JR.
Commissioner of Patents

FORM PO-1050 (10-69)